United States Patent
Weikard et al.

(10) Patent No.: US 6,753,394 B2
(45) Date of Patent: Jun. 22, 2004

(54) RADIATION-HARDENING COATING COMPOSITIONS

(75) Inventors: Jan Weikard, Odenthal-Erberich (DE); Wolfgang Fischer, Meerbusch (DE); Manfred Müller, Mönchengladbach (DE); Thomas Fäcke, Brigdeville, PA (US); Herbert Witossek, Leipzig (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/234,555

(22) Filed: Sep. 4, 2002

(65) Prior Publication Data

US 2003/0050390 A1 Mar. 13, 2003

(30) Foreign Application Priority Data

Sep. 6, 2001 (DE) .......................................... 101 43 630

(51) Int. Cl.⁷ ............................................... C08G 18/62

(52) U.S. Cl. ........................ 526/301; 522/90; 428/423.1
(58) Field of Search ............................ 526/301; 522/90; 428/423.1

(56) References Cited

U.S. PATENT DOCUMENTS

| | | | |
|---|---|---|---|
| 4,380,604 A | 4/1983 | Neuhaus et al. | 524/873 |
| 4,607,084 A | 8/1986 | Morris | 525/454 |
| 5,300,615 A | 4/1994 | Meixner et al. | 528/49 |

Primary Examiner—Rachel Gorr
(74) Attorney, Agent, or Firm—Joseph C. Gill; Gary F. Matz; Thomas W. Roy

(57) ABSTRACT

The invention relates to new, low viscosity radiation-hardenable urethane acrylates prepared from oxalkylated polyols with 25 to 75 mole % of a polyol having a degree of oxalkylation between 3 and 5 and 75 to 25 mole % of a polyol having a degree of oxalkylation between 8 and 25, the resulting coatings having improved abrasion resistance, as well as their use as coating compositions, in particular for flooring materials.

8 Claims, No Drawings

RADIATION-HARDENING COATING COMPOSITIONS

FIELD OF THE INVENTION

The invention relates to new, low viscosity radiation-hardenable urethane acrylates that harden to form coatings having improved abrasion resistance, as well as their use as coating compositions, in particular for flooring materials.

BACKGROUND OF THE INVENTION

Radiation-hardenable coating compositions based on reaction products of hydroxyfunctional esters of (meth) acrylic acid and diisocyanates are termed urethane acrylates and are known for example from P.K.T. Oldring (ed.), Chemistry & Technology of UV & EB Formulations for Coatings, Inks & Paints, Vol. 2, 1991, SITA Technology, London pp. 73–123. They are frequently used to coat parquet and other materials used as floorings. Such coating compositions generally have a high dynamic viscosity of typically more than 10000 mPa.s (at 23° C.) and are therefore diluted with low molecular weight acrylic acid esters (reactive diluents), and are applied together with the addition of photoinitiators and optionally additives by various methods, such as for example roller application, to substrates to be coated and are then hardened under the action of UV radiation. Due to the dilution with reactive diluents the urethane acrylates frequently suffer a deterioration in important properties such as abrasion toughness and viscoelasticity. It is therefore expedient to use particularly low viscosity urethane acrylates in order to keep the amount of reactive diluents low. Readily available starting products for the production of urethane acrylates include hydroxyfunctional esters of (meth)acrylic acid, in most cases 2-hydroxyethyl acrylate or methacrylate as well as 2-hydroxypropyl acrylate or methacrylate. The resulting urethane acrylates are however highly viscous when undiluted (see examples from EP-A 168173).

EP-A 53749 discloses the production of low viscosity urethane acrylates based on diisocyanates or polyisocyanates, hydroxyfunctional acrylic acid esters of 3-fold to 4.5-fold oxalkylated trimethylolpropane and optionally a hydroxyalkyl acrylate. In the cited application, comparison tests show that even with a degree of oxethylation of 7 the corresponding products are insufficiently resistant to polar solvents.

It is an object of the present invention to provide low viscosity urethane acrylates that are resistant to solvents and that have improved abrasion resistance.

It has now been found that urethane acrylates based on diisocyanates or polyisocyanates and hydroxyfunctional (meth)acrylic acid esters of mixtures of high-oxalkylated and low-oxalkylated polyols have a low viscosity, are resistant to solvents, and are particularly abrasion-resistant. This was surprising since it was not expected that there would be a significant difference between urethane acrylates containing for example a 7-fold ethoxylated triol, and urethane acrylates containing a mixture of higher and lower ethoxylated triols that corresponds on average to a 7-fold ethoxylated triol.

SUMMARY OF THE INVENTION

The invention relates to a urethane acrylate prepared from a diisocyanate and/or polyisocyanate and a hydroxyfunctional partial ester wherein the ester is the reaction product of acrylic acid and/or methacrylic acid with a mixture of oxalkylated polyols with three or more hydroxyl groups, wherein the mixture of the oxalkylated polyols contains 25 to 75 mole % of a polyol having a degree of oxalkylation between 3 and 5 and 75 to 25 mole % of a polyol having a degree of oxalkylation between 8 and 25.

The invention also relates to a process for making these urethane acrylates in a two-stage production process by partially esterifying in a first stage an oxalkylated polyol with acrylic acid and/or methacrylic acid and in a second stage reacting the resulting product with a diisocyanate and/or a polyisocyanate.

The invention also relates to a material coated with a coating containing this urethane acrylate.

DETAILED DESCRIPTION OF THE INVENTION

Suitable oxalkylated polyols are prepared from trihydric and higher hydric alcohols in the molecular weight range from 92 to 254, such as for example glycerol, trimethylolpropane, pentaerythritol, ditrimethylolpropane, dipentaerythritol or sorbitol as well as mixtures thereof. Glycerol and trimethylolpropane are preferred. Oxalkylations take place according to methods known per se for the production of polyethers. Suitable monomeric reaction partners for the trihydric and higher hydric alcohols include ethylene oxide, propylene oxide and tetrahydrofuran, preferably ethylene oxide and/or propylene oxide, though mixtures of monomers and/or different monomers in succession (production of "blocks") may also be employed. The expression "degree of oxalkylation" denotes the amount of oxalkylation monomer with reference to the amount of alcohol (e.g. 7.0 moles of ethylene oxide per mole of trimethylolpropane would correspond to a degree of oxalkylation of 7.0).

It is essential that two differently oxalkylated polyols are employed. On the one hand 25 to 75 mole %, preferably 30 to 45 mole % of polyol having a degree of oxalkylation between 3 and 5 are used, and on the other hand the balance of up to 100 mole %, i.e. 75 to 25 mole %, preferably 70 to 55 mole % of polyol having a degree of oxalkylation between 8 and 25, preferably between 8 and 15, particularly preferably between 10 and 13, are used.

The mixture of the oxalkylation polyols is esterified with (meth)acrylic acid according to known methods. A preferred process includes removing the water of reaction by distillation by a solvent that forms an azeotrope with water (azeotropic entraining agent). It is also possible to esterify the various oxalkylated polyols separately and to mix the esters then and/or before the further reaction with polyisocyanates. Optionally the esterification may also be followed by the reaction of residual amounts of acid with epoxides. Such processes are described for example in EP-A 54105, EP-A 126341 and EP-A 900778.

Acrylic acid and/or methacrylic acid are used in an equivalent ratio of acid to hydroxide of 1–1.1 to 1–2.4, preferably 1–1.2 to 1–1.8, more preferably 1–1.3 to 1–1.5, based on the hydroxy groups of the oxalkylated polyols. Instead of the pure acids their accessible anhydrides or oligomerisation products such as methacrylic anhydride or dimeric acrylic acid may be used.

Suitable azeotropic entraining agents include hydrocarbons as well as their halogenated or nitro-substituted products, as well as further solvents that neither react with the reactants nor are affected by the acid catalysts. Unsubstituted hydrocarbons are preferably used. Examples include aliphatic hydrocarbons such as hexane, heptane, octane, petroleum spirit fractions of different boiling point ranges; cycloaliphatic hydrocarbons such as cyclopentane, cyclohexane, methylcyclohexane; or aromatic hydrocarbons such as benzene, toluene or the isomeric xylenes. Preferred solvents boil in the range from 70° to 120° C. Cyclohexane, toluene or petroleum spirit fractions that boil in the range from 70° to 120° C. are more preferred. The non-water-miscible solvent may also be a mixture of the aforementioned substances. The solvent is used in an amount of 10 to 100 wt. %, preferably 15 to 50 wt. %, particularly preferably 20 to 40 wt. %, based on the weight of the reaction components to be esterified.

Suitable acid esterification catalysts include inorganic or organic acids in an amount of 0.1 to 3.0 wt. %, preferably 0.5 to 1.5 wt. % based on the weight of the reaction components to be esterified. Examples of such esterification catalysts include sulfuric acid, phosphoric acid, pyrophosphoric acid, p-toluenesulfonic acid, styrene-divinylbenzenesulfonic acid, chlorosulfonic acid, chloroformic acid, preferably sulfuric acid and p-toluenesulfonic acid. Furthermore, acid catalysts that are bound to solid resins, for example ion exchangers, can also be used.

The reaction may be carried out in the presence of one or more polymerization inhibitors in an amount of 0.01 to 1 wt. %, preferably 0.1 to 0.5 wt. % based on the mixture to be esterified. Such inhibitors are described for example in Houben-Weyl, Methoden der Organischen Chemie, 4$^{th}$ Edition, Vol. XIV/1, Georg Thieme Verlag, Stuttgart 1961, p. 433 et seq. Examples include sodium dithionite, sodium hydrogen sulfide, sulfur, hydrazine, phenylhydrazine, hydrazobenzene, N-phenyl-β-naphthylamine, N-phenylethanoldiamine, dinitrobenzene, picric acid, p-nitrosodimethylaniline, diphenylnitrosamine, phenols such as p-tert.-butylpyrocatechol, 2,5-di-tert.-amylhydroquinone, nitroxyl compounds, p-alkoxyphenols, di-tert.-butylhydroquninone, tetramethylthiuram disulfide, 2-mercaptobenzthiazole and dimethyldithiocarbamic acid sodium salt. Furthermore in a preferred variant an oxygen-containing gas, preferably air, is passed through the reaction mixture containing the solvent.

The esterification of the (meth)acrylic acid can be carried out in a temperature range from 60° to 140° C., preferred 70° to 120° C., more preferred at the boiling point of the solvent that is used. The solvent is continuously removed by distillation from the reaction mixture, condensed outside the reaction vessel in a water separator, separated from entrained water, and then returned to the reaction mixture. The end of the reaction is reached when an amount of water corresponding to the desired degree of reaction has been separated or when the acid number of the reaction mixture has fallen to the value corresponding to the desired degree of reaction. The acid number is then between 0.1 and 15 mg, preferably between 1 and 5 mg of potassium hydroxide per gram of reaction mixture. Following this, the esterification catalyst may optionally be neutralized, precipitated and/or filtered off, and if necessary the solvent can be distilled off and residual acid can be reacted with epoxy compounds that may optionally contain unsaturated groups. In a preferred embodiment, 0.8 to 1.5, preferably 0.9 to 1.1 moles of glycidyl methacrylate are added per mole of residual acid and then reacted at 70° to 130° C., preferably 80° to 110° C., until an acid number of below 3 mg, preferably below 1 mg of potassium hydroxide per gram of reaction mixture has been reached.

If the solvent has not yet been distilled off before the reaction with the epoxy compound, it is removed after this reaction. Preferably the distillation is carried out under reduced pressure until the flashpoint of a sample is above 100° C.

Instead of the esterification of acid and polyol, transesterification processes may also be employed. The principle of these processes is described for example in DE-A 4019788. In this case instead of (meth)acrylic acid, its esters with low molecular weight alcohols such as for example methanol or ethanol are used. In this case, in addition no water is split off but instead the low molecular weight alcohol is removed by distillation from the reaction mixture. With this process the azeotropic entraining agent can be omitted.

The hydroxyfunctional partial esters of variously oxalkylated polyols and (meth)acrylic acid that are formed generally have a dynamic viscosity of below 1000 mPa.s at 23° C., and are clear and water-white or are slightly colored. These products are reacted in a second reaction stage with a diisocyanate and/or polyisocyanate—hereinafter termed polyisocyanate.

In addition to the hydroxyfunctional partial esters of variously oxalkylated polyols and (meth)acrylic acid, there may optionally be used further isocyanate-reactive compounds. Their amount is however limited for the urethane acrylates according to the invention: less than 0.4 equivalent, preferably less than 0.2 equivalent of further isocyanate-reactive compounds are used per isocyanate equivalent.

Such compounds may include esters containing a free hydroxyl group of acrylic acid or methacrylic acid with dihydric alcohols, such as for example 2-hydroxyethyl (meth)acrylate, 2- or 3-hydroxypropyl (meth)acrylate or 2-, 3- or 4-hydroxybutyl (meth)acrylate, as well as their reaction products with lactones such as for example ε-caprolactone, or also arbitrary mixtures of such compounds; (cyclo)alkanediols (i.e. dihydric alcohols with (cyclo)aliphatically bound hydroxyl groups) in the molecular weight range from 62 to 286, such as for example ethanediol, 1,2- and 1,3-propanediol, 1,2-, 1,3- and 1,4-butanediol, 1,5-pentanediol, 1,6-hexanediol, neopentyl glycol, cyclohexane-1,4-dimethanol, 1,2- and 1,4-cyclohexanediol, 2-ethyl-2-butylpropanediol, 2-diethyl-1,3-propanediol, 2,2-dimethyl-1,3-propanediol, 2-ethyl-1,3-hexanediol, 2,5-dimethyl-1,6-hexanediol, 2,2,4-trimethyl-1,3-pentanediol, (3-hydroxy-2,2-dimethyl-propyl)-3-hydroxy-2,2-dimethyl propionate; diols containing ether-type oxygen such as diethylene glycol, triethylene glycol, tetraethylene glycol, dipropylene glycol, tripropylene glycol; or polyethylene, polypropylene or polybutylene glycols with a maximum molecular weight of about 2000, preferably about 1000 and particularly preferably about 500. Reaction products of the aforementioned diols with ε-caprolactone or other lactones may also be used as diols. Known polyester diols can also be used, which are formed from the above diols and aromatic and/or preferably (cyclo)aliphatic dicarboxylic acids and/or their anhydrides, such as phthalic acid, phthalic anhydride, isophthalic acid, tetrahydrophthalic acid, tetrahydrophthalic anhydride, hexahydrophthalic acid, hexahydrophthalic anhydride, cyclohexanedicarboxylic acid, maleic anhydride, fumaric acid, malonic acid, succinic acid, succinic anhydride, glutaric acid, adipic acid, pimelic acid, suberic acid, sebacic acid, dodecanedioic acid, and hydrogenated dimeric fatty acids.

However, it is particularly preferred to omit further isocyanate-reactive compounds mentioned above.

Suitable polyisocyanates include known organic polyisocyanates having aliphatically, cycloaliphatically and/or aromatically bound isocyanate groups and preferably have a molecular weight of 144 to 1000, more preferably 168 to 300. Suitable examples include butylene diisocyanate, hexamethylene diisocyanate (HDI), isophorone diisocyanate (IPDI), 3(4)-isocyanatomethyl-methylcyclohexyl isocyanate (IMCI), trimethylhexamethylene diisocyanate (=2,2,4 and/or 2,4,4-trimethyl-hexamethylene diisocyanate), the isomeric bis(4,4'-isocyanato-cyclohexyl)methanes ($H_{12}$MDI), the isomeric bis(isocyanatomethyl)-methylcyclohexanes, isocyanatomethyl-1,8-octane diisocyanate, 1,4-cyclohexylene diisocyanate, 1,4-phenylene diisocyanate, 2,4- and/or 2,6-toluylene diisocyanate (TDI), 1,5-naphthylene diisocyanate, 2,4'- and/or 4,4'-diphenylmethane diisocyanate (MDI), triphenylmethane-4,4',4"-triisocyanate or their derivatives having a urethane, isocyanurate, allophanate, biuret, uretdione, iminooxadiazinedione structure and/or mixtures thereof as well as mixtures of aliphatic and aromatic diisocyanates and/or polyisocyanates. These derivatives generally have an average molecular weight of up to about 1000. The production of such derivatives is described for example in U.S. Pat. No. 3,124,605, U.S. Pat. No. 3,183,112, U.S. Pat. No. 3,919,218, U.S. Pat. No. 4,324,879 or EP-A 798 299.

Preferably used are HDI, IPDI, TDI, $H_{12}$MDI and/or isocyanate group-containing polyisocyanates obtained by trimerization of HDI, TDI or IPDI. Particularly preferred are HDI and IPDI and mixtures thereof.

The polyisocyanates are used in an equivalent ratio of isocyanate groups to hydroxyl groups of 1:1 to 1:3, preferably 1:1 to 1:2, particularly preferably 1:1 to 1:1.5. The degree of conversion is usually monitored by following the isocyanate content of the reaction mixture. For this purpose, spectroscopic measurements (infrared or near-infrared regions of the spectrum) as well as chemical analysis (titrations) of samples may be carried out. The reaction is preferably carried out up to an isocyanate content of 0.2% or below. Reaction temperatures are maintained at 20° to 100° C., particularly preferably 50° to 80° C. The starting components for the reaction may be reacted in any desired order. The reaction is preferably carried out in the presence of suitable catalysts for the urethanization reaction, such as for example tin(II) octoate, dibutyltin dilaurate or tertiary amines such as diazabicyclooctane.

The urethane acrylates that are thereby produced are preferably used as the main constituent of coating compositions. These coating compositions may furthermore contain additional substances and auxiliary substances, for example known initiators that can trigger a free-radical polymerization after irradiation with high-energy radiation such as for example UV light. Such photoinitiators are described for example in P.K.T. Oldring (ed.), Chemistry & Technology of UV & EB Formulations for Coatings, Inks & Paints, Vol. 3, 1991, SITA Technology, London (pp. 61–325). Examples include 1-hydroxycyclohexylphenyl ketone, benzil ketals such as for example benzil dimethylketal, acylphosphine oxides such as for example bis-(2,4,6-trimethylbenzoyl)-phenylphosphine oxide, diacylphosphine oxides, benzophenone and its derivatives. They are employed alone or as a mixture, optionally also together with further accelerators or co-initiators as additive, in amounts, based on the solids content of the coating system, of 0.1 to 10 parts by weight, preferably 2 to 7 parts by weight, particularly preferably 3 to 4 parts by weight. The photopolymerization may also be carried out in an inert gas atmosphere, in which the amount of photoinitiators may be chosen to be significantly less than when hardening in air. Photoinitiators may be omitted if the coating compositions are to be hardened by means of electron beams.

The coating compositions may be mixed with diluents as additives that also (co)polymerize in the UV hardening. Such reactive diluents are described in P.K.T. Oldring (ed.), Chemistry & Technology of UV & EB Formulations for Coatings, Inks & Paints, Vol. 2, 1991, SITA Technology, London pp. 237–285. Examples include the esters of acrylic acid or methacrylic acid, preferably acrylic acid, and alcohols like monohydric alcohols including the isomeric butanols, pentanols, hexanols, heptanols, octanols, nonanols and decanols, as well as cycloaliphatic alcohols such as isobornol, cyclohexanol and alkylated cyclohexanols, dicyclopentanol, arylaliphatic alcohols such as phenoxyethanol and nonylphenylethanol, as well as tetrahydrofuryl alcohols. Alkoxylated derivatives of these alcohols are also suitable. Suitable dihydric alcohols include ethylene glycol, propanediol-1,2, propanediol-1,3, diethylene glycol, dipropylene glycol, the isomeric butanediols, neopentyl glycol, hexanediol-1,6, 2-ethylhexanediol and tripropylene glycol or also alkoxylated derivatives of these alcohols. Preferred dihydric alcohols are hexanediol-1,6, dipropylene glycol and tripropylene glycol. Trihydric alcohols include glycerol or trimethylolpropane or their alkoxylated derivatives. Propoxylated glycerol is preferred. Since the urethane acrylates according to the invention have a comparatively low viscosity, often less reactive diluent is required compared to urethane acrylates of the prior art in order to achieve the same viscosity.

The coating compositions produced according to the invention may furthermore be mixed with a very wide range of auxiliary substances and additives. These include fillers, pigments, dyes, smoothing agents, matting agents, degassing agents such as polyacrylates, coupling agents such as aminoalkyltrialkoxysilanes and flow control agents such as polysiloxanes, which are used in the amounts normally employed in coating technology. In order to improve the resistance to weathering influences such as for example sunlight, light stabilizers such as UV absorbers and sterically hindered amines may be added in the usual amounts. When using UV absorbers, a proportion of the photoinitiator must generally be a type that absorbs at longer wavelengths. The use of light stabilizers and the various types are described for example in A. Valet, Lichtschutzmittel für Lacke, Vincentz Verlag, Hanover, 1996. It is also possible to use solvents that are inert within the context of free-radical polymerization, which are then removed between the coating and hardening, if necessary by application of heat.

The coating compositions containing the urethane acrylates according to the invention are suitable for the production of high-grade coatings, coverings and lacquers on various substrates such as for example paper, cardboard, leather, textiles, glass, plastics materials, metal, e.g. aluminium or steel sheeting, which may optionally have been subjected to a preliminary treatment, as well as metal in the form of so-called "coils", wood, in particular parquet or timber-derived materials such as for example medium density fiberboard, plastics materials such as for example polycarbonate or polyvinyl chloride sheeting (PVC), mineral materials such as, for example, cement, clay, minerals, ceramics or such substrates fabricated from the aforementioned materials that have already been coated, for example, automobiles or automobile parts. Substrates consisting of several of the aforementioned materials may also be coated. The coating compositions according to the invention are particularly suitable for the abrasion-resistant coating of materials used for flooring purposes, in particular parquet woods and PVC sheeting.

The coating compositions is applied to the material to be coated by conventional methods known in lacquer technology such as extrusion, knife application, rolling, pouring, dipping, centrifugal casting and vacuum spraying. The liquid coating compound is hardened by irradiation with ultraviolet radiation or electron beams. To this end the coated material is moved for example under a mercury medium-pressure radiator. Hardening by means of UV radiation is carried out in a known manner and is described for example in P.K.T. Oldring (ed.), Chemistry & Technology of UV & EB Formulations for Coatings, Inks & Paints, Vol. 1, 1991, SITA Technology, London pp.167–269.

EXAMPLES

Partial ester of oxalkylated polyol and acrylic acid:

A) 860.6 g of an on average 12-fold ethoxylated, trimethylolpropane-started polyether (hydroxyl number 255, dynamic viscosity 265 mPa.s at 23° C.), 214.2 g of an on average 4-fold ethoxylated, trimethylolpropane-started polyether (hydroxyl number 550, dynamic viscosity 505 mPa.s at 23° C.), 309.6 g of acrylic acid, 9.3 g of 4-toluenesulfonic acid, 3.9 g of 4-methoxyphenol, 0.3 g of 2,5-di-tert.-butylhydroquinone and 560.1 g of isooctane were weighed out into an apparatus equipped with water separator, stirrer, gas inlet line and thermometer, while passing air through the apparatus (in an amount equal to the volume of the apparatus per hour) and passing nitrogen over the reaction mixture (in an amount equal to twice the volume of the apparatus per hour). The reaction mixture was heated to the reflux temperature (ca. 94°-108° C.) while stirring and was vigorously refluxed until the acid number had reached a value of less than 4.5. During this time about 77 g of water distilled off. The reaction mixture was then cooled to 50° C. A vacuum was slowly applied at 50° C. and the solvent distilled off until, at 90° C. and under a vacuum (<50 mbar), no more solvent distilled off. The reaction mixture was ventilated and 26.3 g of glycidyl methacrylate were added in one go while stirring. The reaction mixture was stirred for 1 hour at 100° C., the acid number of the product then being below 2 and the hydroxyl number between 80 and 90.

B) Experiment A) was repeated except that, instead of the on average 4-fold ethoxylated, trimethylolpropane-started polyether, 214.2 g of an on average 3-fold propoxylated, trimethylolpropane-started polyether was now used (hydroxyl number 550, dynamic viscosity 1800 mPa.s at 23° C.).

Urethane Acrylates

According to the following table, the partial ester of oxalkylated polyol and acrylic acid, as well as 0.1 wt. % based on the overall reaction mixture, of 2,6-di-tert.-butyl-4-methylphenol, and 0.05 wt. % referred to the total reaction mixture, of tin(II) ethylhexoate were in each case weighed out into an apparatus equipped with stirrer, gas inlet line and thermometer while passing air through the apparatus (in an amount equal to the volume of the apparatus per hour) and passing nitrogen over the mixture (in an amount equal to twice the volume of the apparatus per hour) and heated to 55° C. while stirring. The corresponding isocyanates were then added dropwise so as to maintain a temperature of 55° to 60° C. with the exothermic reaction. After the end of the addition of the reactants (ca. 1 hour) the temperature was adjusted to 60° C. and maintained at this value until the NCO content was below 0.1% (ca. 8 hours).

| Production of the Urethane Acrylates | | | | Lacquer Tests | |
|---|---|---|---|---|---|
| Example No. | Partial Ester | Isocyanate | Viscosity [23° C.] | Abrasion | Resistance |
| 1 | A [450.9 g] | Mixture of TDI [25.0 g] and HDI [24.2 g] | 2600 mPa · s | 7900 cycles per 100 μm coating thickness | 1 (NaOH)/ 2 (ethanol) |
| 2 | B [430.0 g] | IPDI [62.0 g] | 4300 mPa · s | 5600 | 1/3 |
| 3 | A [450.9 g] | First HDI [24.2 g], then TDI [25.0 g] | 3100 mPa · s | 10100 | 1/2 |
| 4 | A [444.1 g] | IPDI [56.0 g] | 8000 mPa · s | 7300 | 1/1 |
| 5 | A [450.0 g] | TDI [50.0 g] | 5600 mPa · s | 7000 | 1/2 |
| Comparison: Example 6 of EP-A 53 749 | | | | 4000 | 1/2 |
| Comparison: Example 3 of EP-A 53 749 | | | | 4300 | 1/2 |

TDI—Desmodur T80, Bayer AG, Leverkusen, Germany;
HDI—Desmodur H, Bayer AG, Leverkusen, Germany;
IPDI Desmodur I, Bayer AG, Leverkusen, Germany.

85 parts by weight of urethane acrylate together with in each case 16 parts by weight of dipropylene glycol diacrylate (BASF AG, Ludwigshafen, Germany) and 2.5 parts by weight of the photoinitiator Darocur 1173, Ciba Spezialitätenchemie, Lampertheim, Germany, were applied by means of a spiral coating knife to pickled medium density fiberboard (MDF) and hardened using UV light (strip arrangement, 1 radiator, 80 W/cm lamp length [CK radiator, IST, Metzingen, Germany]). For the abrasion tests, coatings were prepared as follows: once with handcoater #2 (ca. 18 μm), two passes at a strip speed of 15 m/min, then twice with handcoater #3 (ca. 30 μm) and one pass at a strip speed of 5 m/min. The resultant layer thickness was determined microscopically (light section microscopy). For the resistance tests, coatings ca. 120 μm thick were produced on MDF using a spiral coating knife and hardened by one passage at a strip speed of 5 m/min.

The abrasion tests were carried out with a Taber Abraser Model 5130 and a Taber Abraser Grip Feeder, Model 155, both from Erichsen, using aluminium oxide (Alodur® EPL) from Treibacher Schleifmittel, Villach, Austria, which was screened (200 μm mesh width) and dried (1 hour at 80° C.). The abrasion tests were carried out according to the instructions BA 155/D—VI/1995 published by Erichsen at a loading of 1000 g per axle, scattering amount 85 (corresponding to 34 g per 100 revolutions). The calibration was carried out with an acrylic sheet. An abrasion of 142 mg was found at 2000 revolutions (desired value 127±18 mg). The number of cycles was measured in each case until the coating was destroyed. The given number of cycles per 100 μm of layer together with the measured layer thickness were recorded.

The resistance tests were carried out using 48% aqueous ethanol and 16% sodium hydroxide. In each case, impregnated cotton swabs were placed on the coatings for 16 hours so as to cover the latter. The surfaces were then wiped with a dry soft cloth and assessed visually. The results were recorded in the form of scores (0—unchanged, to 5—destroyed).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A urethane acrylate prepared from a diisocyanate and/or polyisocyanate and a hydroxyfunctional partial ester wherein the ester is the reaction product of acrylic acid and/or methacrylic acid with a mixture of oxalkylated polyols containing three or more hydroxyl groups, wherein the mixture of the oxalkylated polyols comprises 25 to 75 mole % of a polyol having a degree of oxalkylation between 3 and 5 and 75 to 25 mole % of a polyol having a degree of oxalkylation between 8 and 25.

2. The urethane acrylate of claim 1 which is free from hydroxy-$C_{1-4}$-alkyl acrylates and methacrylates.

3. The urethane acrylate of claim 1 wherein the mixture of the oxalkylated polyols comprises 30 to 45 mole % of polyol having a degree of oxalkylation between 3 and 5 and 70 to 55 mole % of polyol having a degree of oxalkylation between 8 and 15.

4. The urethane acrylate of claim 1 wherein the diisocyanate and/or polyisocyanate comprises a mixture of aliphatic and aromatic diisocyanates and/or polyisocyanates.

5. A process for making a low viscosity, radiation-hardenable urethane acrylate comprising in a first stage partially esterifying a mixture of oxalkylated polyols with acrylic acid and/or methacrylic acid and in a second stage reacting the resulting product with a diisocyanate and/or a polyisocyanate, wherein the mixture of the oxalkylated polyols comprises 25 to 75 mole % of a polyol having a degree of oxalkylation between 3 and 5 and 75 to 25 mole % of a polyol having a degree of oxalkylation between 8 and 25.

6. A material coated with a coating comprising the urethane acrylate of claim 1.

7. The material of claim 6 comprising paper, cardboard, leather, textile, glass, metal or a plastic material.

8. The material of claim 6 comprising wooden flooring, PVC flooring and parquet flooring made of wood and plastic material.

* * * * *